(12) United States Patent  
Zarris

(10) Patent No.: US 7,953,323 B2  
(45) Date of Patent: May 31, 2011

(54) TIME MULTIPLEXED SPACE SWITCH

(76) Inventor: George Zarris, Colchester (GB)

( * ) Notice: Subject to any disclaimer, the term of this patent is extended or adjusted under 35 U.S.C. 154(b) by 872 days.

(21) Appl. No.: 11/859,082

(22) Filed: Sep. 21, 2007

(65) Prior Publication Data

US 2009/0080895 A1   Mar. 26, 2009

(51) Int. Cl.
*H04J 14/00* (2006.01)
(52) U.S. Cl. ............................... 398/47; 398/52; 398/53
(58) Field of Classification Search .............. 398/45–48, 398/52–55, 98
See application file for complete search history.

(56) References Cited

U.S. PATENT DOCUMENTS

| 5,623,356 A * | 4/1997 | Kaminow et al. ............... 398/46 |
| 2003/0030887 A1 * | 2/2003 | Lee et al. ...................... 359/326 |
| 2003/0193937 A1 * | 10/2003 | Beshai et al. ................. 370/372 |

OTHER PUBLICATIONS

G. Zarris et al, "An All-Optical Time-Slot Interchange Architecture," European Conference on Optical Communications 2006 Proceedings, conference held in Cannes, France Sep. 2006, 3 pages.
Paulo J. Almeida et al, "OTDM Add-Drop Multiplexer Based on Time-Frequency Signal Processing," Journal of Lightwave Technology, vol. 24 No. 7, Jul. 2006, pp. 2720 through 2732.
G. Zarris et al, "Applications of Ultra-Short Pulse Sources in OTDM Networks," PS'2006 Photonics in Switching Conference.
J.P. Turkiewicz et al, "160 Gb/s OTDM Networking Using Deployed Fiber," Journal of Lightwave Technology, vol. 23 No. 1, Jan. 2005, pp. 225 through 235.
Z. Yusoff et al, "A 36-Channel×10-GHz Spectrally Sliced Pulse Source Based on Supercontinuum Generation in Normally Dispersive Highly Nonlinear Holey Fiber," IEEE Photonics Technology Letters, vol. 15 No. 12, Dec. 2003, pp. 1689 through 1691.
Zhong Pan et al, "All-optical programmable time-slot-interchanger using optical-label switching with tunable wavelength conversion and N by N arrayed waveguide grating routers," Optical Fiber Communication Conference and Exhibit, OFC 2002, pp. 267 through 268.
Stanley Pau et al, "160-Gb/s All-Optical MEMS Time-Slot Switch for OTDM and WDM Applications," IEEE Photonics Technology Letters, vol. 14 No. 10, Oct. 2002, pp. 1460 through 1462.
Kiyoshi Onohara et al, "Photonic Time-Slot and Wavelength-Grid Interchange for 10-Gb/s Packet Switching," IEEE Photonics Technology Letters, vol. 13. No. 10, Oct. 2001, pp. 1121 through 1123.

(Continued)

*Primary Examiner* — Dzung D Tran
(74) *Attorney, Agent, or Firm* — Kolisch Hartwell, PC

(57) ABSTRACT

The present invention provides an optical time multiplexed space switch including a pulsed laser source, and means for producing from the laser source a plurality of wavelengths of pulsed radiation including means for providing permutable multi-wavelength pulse sequences from said multi-wavelength source and means for translating the input data pulses into the multi-wavelength pulse sequence. Each data pulse is subsequently guided through a wavelength selective structure, which may contain delay lines. In the case of time-slot interchange, the pulses are recombined in an interchanged sequence. In the case of tributary space switching different wavelength pulses are switched to generally different outputs and combine with pulses originating from different inputs. Alternatively, instead of or in addition to the means for providing permutable multi-wavelength pulse sequences from the pulsed source, means are provided for the permutation of the multi-wavelength data pulse sequence in reconfigurable wavelength selective structures.

20 Claims, 7 Drawing Sheets

OTHER PUBLICATIONS

Hideyuki Sotobayashi et al, "Bi-directional photonic conversion between 4×10 Gbit/s OTDM and WDM by optical time-gating wavelength interchange," Copyright 2000 Optical Society of America, Optical Fiber Communication Conference and Exhibit, OFC 2001, vol. 3, pp. WM5-1 through WM5-3.

St. Fischer et al, "40-Gb/s OTDM to 4×10 Gb/s WDM Conversion in Monolithic InP Mach-Zehnder Interferometer Module," IEEE Photonics Technology Letters, vol. 11 No. 10, Oct. 1999, pp. 1262 through 1264.

David Norte and Alan E. Willner, "All-Optical Data Format Conversions and Reconversions Between the Wavelength and Time Domains for Dynamically Reconfigurable WDM Networks," Journal of Lightwave Technology, vol. 14 No. 6, Jun. 1996, pp. 1170 through 1182.

David K. Hunter and D. Geoffrey Smith, "New Architectures for Optical TDM Switching," Journal of Lightwave Technology, vol. 11, No. 3, Mar. 1993, pp. 495 Through 511.

Hisashi Kobayashi and Ivan P. Kaminow, "Duality Relationships among 'Space,' 'Time,' and 'Wavelength' in All-Optical Networks," Journal of Lightwave Technology, vol. 14 No. 3, Mar. 1996, pp. 344 through 351.

R. A. Thompson and P.P. Giordano, "An Experimental Photonic Time-Slot Interchanger Using Optical Fibers as Reentrant Delay-Line Memories," Journal of Lightwave Technology, vol. LT-5, No. 1, Jan. 1987 pp. 154-162.

M.C. Cardakli et al, "All-optical time-slot-interchange and wavelength conversion using difference-frequency-generation and FGBs," Conference on Optical Fiber Communications '00, Post-Deadline paper PD-34, Baltimore, MD, Feb. 2000, pp. 196-198.

* cited by examiner

TIME MULTIPLEXED SPACE SWITCH

BACKGROUND

The present invention relates to time division multiplexing of data channels and in particular to time division multiplexing and switching of bit-interleaved digital communication channels by optical techniques. The present invention is particularly applicable to communications switching systems in the core communication network.

There is considerable interest today in ultra-high speed optical transmission. For example, 100 Gigabit per second Ethernet is considered to be the next big leap in transmission and networking from the metro to the core or backbone network. Even with the application today of wavelength division multiplexing, also know as WDM, which increases the data transmission capacity of an optical fiber by one or two orders of magnitude, there is interest in transmitting ultra-high bit-rate channels for economic as well as networking reasons. First, reducing the number of interfaces, or ports, in the core network at the wavelength level may bring economic benefits. Second, the development of new applications and networking practices at the edge of the core network result in the need for containing ultra-high bit-rate data transmission on a single channel. From an historical perspective, the data channel bit-rate adopted for transmission in the core network has always been the highest possible technology can support in an economic way. Today that the rates envisioned are 100 Gbit/s or higher, both electronic and optical techniques have been proposed for multiplexing starting from lower bit-rate tributaries, such as 10 Gbit/s or 40 Gbit/s. This multiplexing in time is called Time Division Multiplexing, also known as TDM. When optical techniques are used to multiplex to these ultra-high bit-rates, the term used is Optical Time Division Multiplexing, also known as OTDM. Specifically, the employment of OTDM techniques allows bit-rates of hundreds of Gigabit per second to be reached on a single wavelength channel.

However, efficient networking in the core network dictates the switching in space—for example between different fibers—of both the wavelengths and the lower bit-rate tributaries, of which these higher bit-rate wavelengths consist of. While several OTDM techniques have been proposed to multiplex lower bit-rate tributaries to ultra-high bit-rates and, conversely, de-multiplex ultra-high bit-rates to lower bit-rate tributaries, the problem of switching tributaries in space using optical techniques has not so far been properly addressed. One reason is because an efficient utilization of transmission bandwidth dictates that space switching of tributaries also involves switching in time, which is to say that tributary channels are individually delayed in the time domain to avoid collision, or in other words to avoid overlap, before they are multiplexed back to ultra-high bit-rate channels. FIG. 1 shows an example prior art arrangement for switching tributaries in space and time. This architecture which involves in sequence Time-Space-Time switching, also known as T-S-T, is in use today and is employed by electronics. With reference to FIG. 1, suppose that the higher bit-rate channel consists of four tributaries. A frame, consisting of four time-slots, or slots, each belonging to one of the four tributaries, of such a higher rate channel is shown 4 for the higher bit-rate channel which is input at 6. The repetition in time of said frame composes the higher data channel. A second channel of the same nominal higher rate is input at 12. A frame of that channel is shown 10, and it includes one empty slot 8, which means that no information is carried in 8. Suppose that slot 2, needs to be switched to the empty slot 8. As shown in this example, slot 2 has to be delayed by one slot. Therefore, space switching alone does not suffice. Space switching alone would create a collision of 2 with slot 14, used by the corresponding tributary. Therefore Time-Slot Interchange, also known as TSI, has to be employed. Depending on the characteristics of the space switch 18, TSI 16 may be required before the space switch in order to avoid collision, also known as blocking, inside the space switch, as well as after the space switch 20, so that the time slots are re-ordered as required by subsequent network elements. The combination of space and time switching, which was illustrated above with the example of the generic T-S-T architecture, is usually referred to as Time Multiplexed Space switching, also known as TMS switching. It is noted that each time-slot may consist of a multiple sequence of bits belonging to the corresponding tributary occupying the said slot. In the special case where each slot consists of a single bit of information, the higher rate channel consisting of a number of such slots is called Bit-Interleaved Time Division Multiplexed channel, and the scheme of multiplexing and switching in space and time a number of such channels is called Bit-Interleaved Time Division Multiplexing. Another definition relates to the so called frame integrity. When the data content of a time-slot within a frame is only permitted to switch to another time-slot of the same frame the condition is called frame integrity. Conversely, when there is no such restriction, meaning that it is acceptable for the data content of one time-slot to be switched to another time-slot of a different frame, the condition is called non-frame integrity. It is also noted that, typically, in TMS switching implementations all input channels have to be in synchronism. With reference to FIG. 1, this means that all inputs such as those numbered 6 and 12, have to be synchronized, or time aligned, with a common clock. In the special case of bit-interleaved time division multiplexing, time alignment more accurate than the bit period, or bit duration, is required.

SUMMARY OF THE INVENTION

The switching of channel tributaries in the space and time domains has so far been implemented with electronics. This is because the implementation of time switching in the optical domain has been considered much more difficult. Delaying channel tributaries in an optical medium, as would be required in the time-slot interchange part of an optical time multiplexed space switch, is conventionally considered problematic partly because there is no equivalent in optics of the Random Access Memory, which is typically employed by electronics to delay data channels. In optics, such a function is typically implemented by propagating light in optical media which provide a predetermined delay. These media, such as optical fiber, are called delay lines and when the delay provided is fixed they are called fixed delay lines. Given that in time-slot interchange the number of delay lines is at least equal to the number of channel tributaries, as each tributary of a higher rate channel may have to be delayed by a different amount, a second associated problem arises with implementing time-slot interchange in the optical domain. This second problem is that switching individual time-slots to individual delay lines typically requires a large number of fast optical switches.

The present invention aims to provide a pulsed multi-wavelength laser source and associated architectures for time-slot interchange and space switching of wavelength tributaries which mitigate some or all of these problems.

Accordingly, in a first aspect, the present invention provides an optical time multiplexed space switch including a pulsed laser source, and means for producing from the laser source a plurality of wavelengths of pulsed radiation including means for providing permutable multi-wavelength pulse sequences from said multi-wavelength source, and means for translating the input data pulses into the multi-wavelength pulse sequence. Each data pulse is subsequently guided through a wavelength selective structure, which may contain delay lines. In the case of time-slot interchange, the pulses are recombined in an interchanged sequence. In the case of tributary space switching different wavelength pulses are switched to generally different data outputs and combine with data pulses originating from different data inputs. Alternatively, instead of or in addition to the means for providing permutable multi-wavelength pulse sequences from the pulsed source, means are provided for the permutation of the multi-wavelength data pulse sequence in reconfigurable wavelength selective structures.

Thus by producing multi-wavelength data pulse sequences a reduced number of optical gates is required. The gate could, for example, be based on semiconductor optical amplifier-based Mach-Zehnder interferometer or on any other technology or technique which can translate an input data pulse sequence into an output multi-wavelength data pulse sequence according to a multi-wavelength pulse sequence, which is also input to the gate.

Preferably the pulsed laser source is a quantum-dot mode-locked laser which can produce sub-picosecond high quality pulses. Preferably only one pulsed laser source is included although in some circumstances more than one pulsed sources may be provided, for example, when one pulsed source cannot produce all the required wavelengths. Preferably the plurality of wavelengths of pulsed radiation is provided by spectrally slicing the narrow pulse of the pulsed source with the use of spectral filters. Preferably such a filter is an arrayed waveguide grating. In some embodiments the spectral filters are followed by power splitters which split each wavelength pulse into a number of replicas. This allows the selection in the subsequent switch of more than one pulses of the same wavelength to produce a pulse sequence which includes more than one instances of the same wavelength pulse. In some other embodiments a larger number of wavelengths is provided to negate or reduce the requirement for splitters. In some embodiments optical variable attenuators are used in each or in some propagation paths in order to provide means of controlling the power of individual wavelength pulses. In some embodiments such an attenuation is provided within the space switch. The space switch may only need reconfiguring when the time multiplexed space switch needs reconfiguring. Therefore, slow switching speed space switches such as micro-electromechanical systems (MEMS) space switches may suffice. The space switch may be followed by a series of paths with delay lines and all paths are subsequently coupled using either a power coupler or, if this is suitable, a wavelength multiplexer. The resulting multi-wavelength pulse sequence is input to a gate which translates input data, which is also input to the gate, to a sequence of multi-wavelength data pulses; said pulses are subsequently routed, according to each pulse wavelength, in a wavelength selective structure, which may or may not be reconfigurable. In the case of time-slot interchange, said structure contains a number of delay lines, and will be called 'wavelength selective time-slot interchanger'. In the case of tributary switching, the wavelength selective structure—which will be called 'wavelength selective space cross-connect' —may not contain delay lines; however, said structure provides interconnections between a number of higher data rate inputs and a number of higher data rate outputs, thus facilitating tributary switching. In some embodiments of either the TSI or the tributary space switch, some outputs of the wavelength selective structure are followed by another gate which may translate the multi-wavelength data pulse sequence output from said structure into a common wavelength.

Preferably the time-slot interchange does not require frame integrity. If frame integrity is required, a different number or kind of wavelengths, splitters and delay lines may be required. Preferably the optical gates also provide signal regeneration. In some embodiments instead of providing permutable multi-wavelength pulse sequences from the pulsed source, a fixed multi-wavelength pulse sequence from the pulsed source is provided, and the permutation of the multi-wavelength data pulse sequence takes place in the subsequent reconfigurable wavelength selective structures.

Preferably any of the embodiments which provide time-slot interchange is either followed or preceded by any of the embodiments which provide tributary space switching, to form time multiplexed space switching architectures.

In a second aspect, the present invention provides a method of providing time multiplexed space switching, suitable for bit-interleaved time division multiplexed communication channels, including the step of producing from a pulsed laser source a plurality of wavelengths, the step of providing time-slot interchange to data channels, and the step of providing tributary space switching.

BRIEF DESCRIPTION OF THE DRAWINGS

Embodiments of the present invention will now be described by way of example with reference to the accompanying drawings in which.

DETAILED DESCRIPTION

Figure 1:
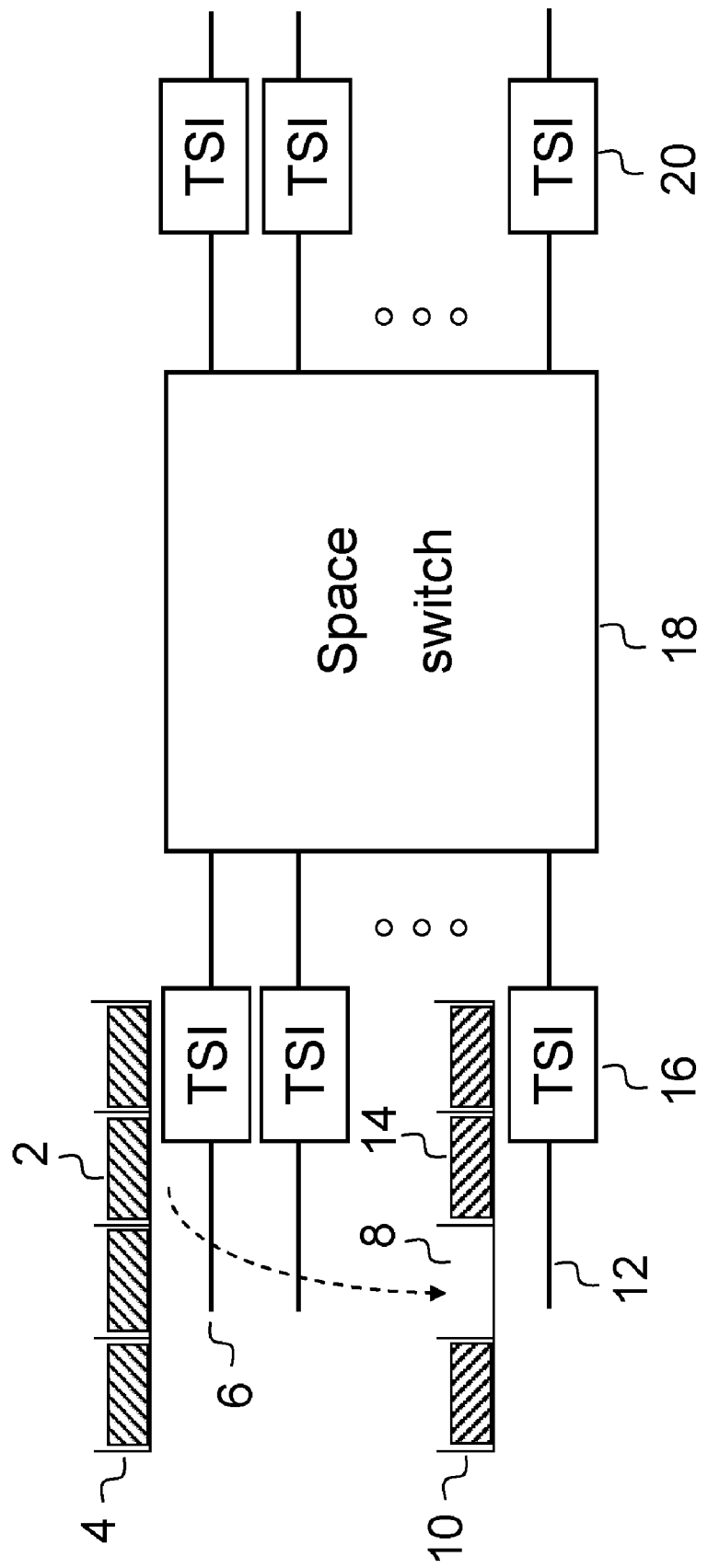
FIG. 1 is a schematic diagram of an example prior art arrangement for switching tributaries in space and time.
Figure 2:
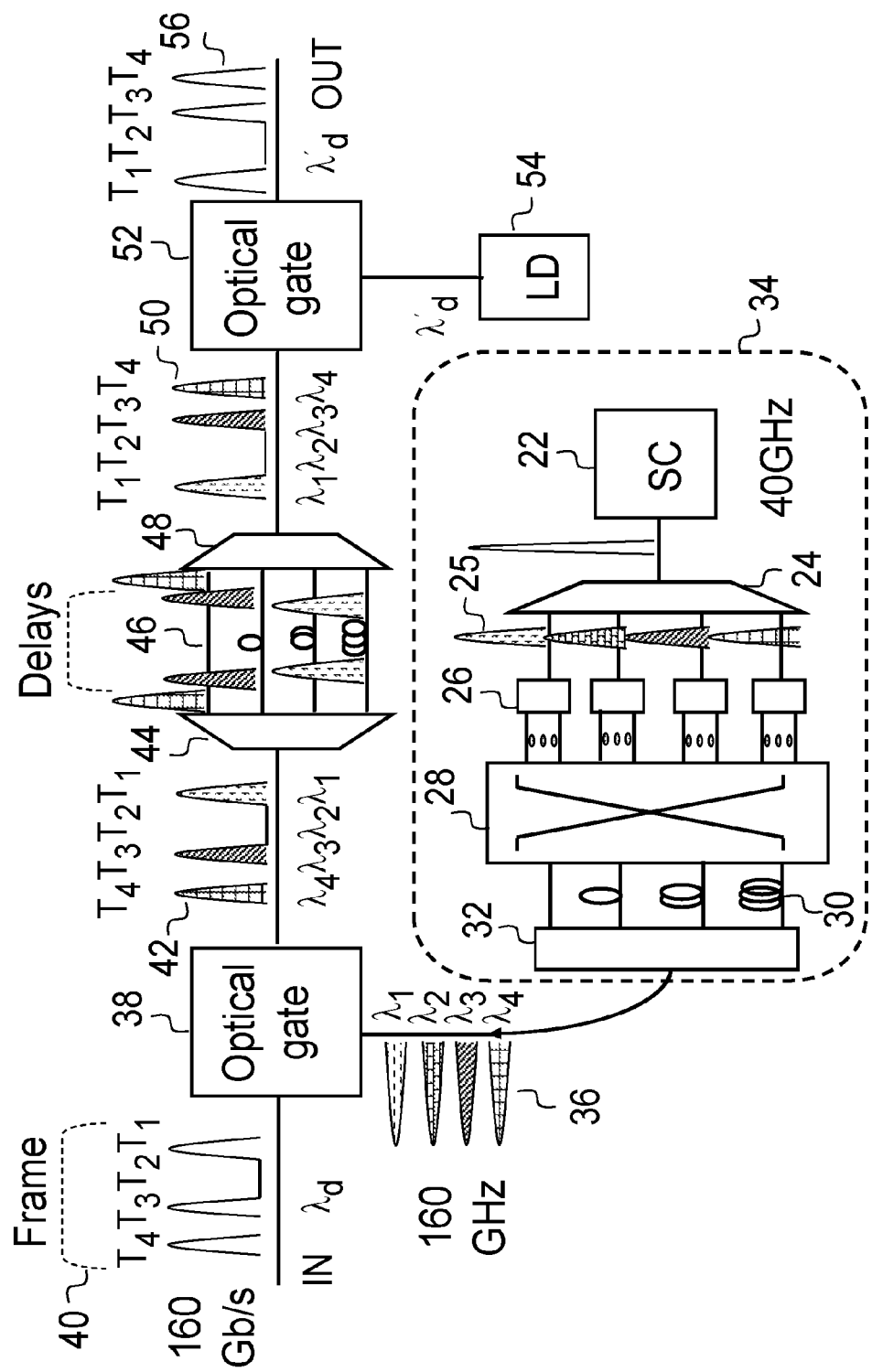
FIG. 2 is a schematic diagram of a first embodiment of a time-slot interchange according to the present invention.

In FIG. 2, a laser source 22 of ultra-short pulse radiation (SC) produces a sequence of pulses of rate equal to the data tributary rate (say, 40 GHz), and is spectrally sliced, using a wavelength de-multiplexer 24, to produce a number of synchronous pulse sequences 25 (in this case, four) each at different wavelength. Subsequently, each pulse is split into a number of pulses of same wavelength using a power splitter 26. A space switch 28 selects a number of thus produced pulses and blocks and discards the pulses which are not needed. Each of the selected pulses is connected by the switch to a delay line 30 of appropriate time delay. In this example the four delay paths differ in delay by one bit period of the higher rate TDM data channel (160 Gb/s). A coupler 32 combines the delayed pulses. In this way, a multi-wavelength pulse sequence 36 is created of 160 GHz rate (4 times 40 GHz), which can be altered by re-configuring the space switch 28. Therefore, the system 34 is a pulsed laser source of a permutable multi-wavelength pulse sequence. Since a relatively slow method of reconfiguration is adequate for circuit switching in a TDM network, the space switch could be realised using a technology such as Micro-Electromechanical Systems (MEMS). With the use of an appropriate fast optical gate 38 which acts as a wavelength converter, and could also act as a signal regenerator, the incoming higher bit-rate (in this case 160 Gb/s) bit-interleaved TDM data channel 40 of which one frame is shown (of bit sequence 1011, as an example), is converted (translated) into a multi-wavelength data pulse sequence 42, according to the pulse sequence 36. This data pulse sequence is subsequently wavelength de-multiplexed at 44 and each pulse is guided through a prior art static wavelength selective structure of four parallel delay lines 46; with successive delay lines differing by an integer number of bit periods of the TDM channel. (It is noted that a sufficient number of delay lines is four for non-frame integrity. In this example, the time-slot interchange depicted in this structure is for illustrative purposes, and may be non-optimum in terms of implementation for a system required to provide any permutation of time-slots). The delayed pulses are combined (or merged), preferably by a wavelength multiplexer 48, with their sequence permuted 50. Therefore, by selecting the right wavelength sequence 36, any permutation of the TDM time slots can be performed. The embodiment is shown for a non-frame integrity example. If frame integrity is required, more parallel delay lines and more wavelengths are required, than shown in FIG. 1. The final part of the architecture is optional and involves translation of sequence 50 into the required output wavelength $\lambda'_d$ using a second optical gate 52 acting as a wavelength converter. The laser diode 54 is used by gate 52 for the wavelength conversion process. The time-slot interchanged TDM data is marked with the numeral 56.

Figure 3:
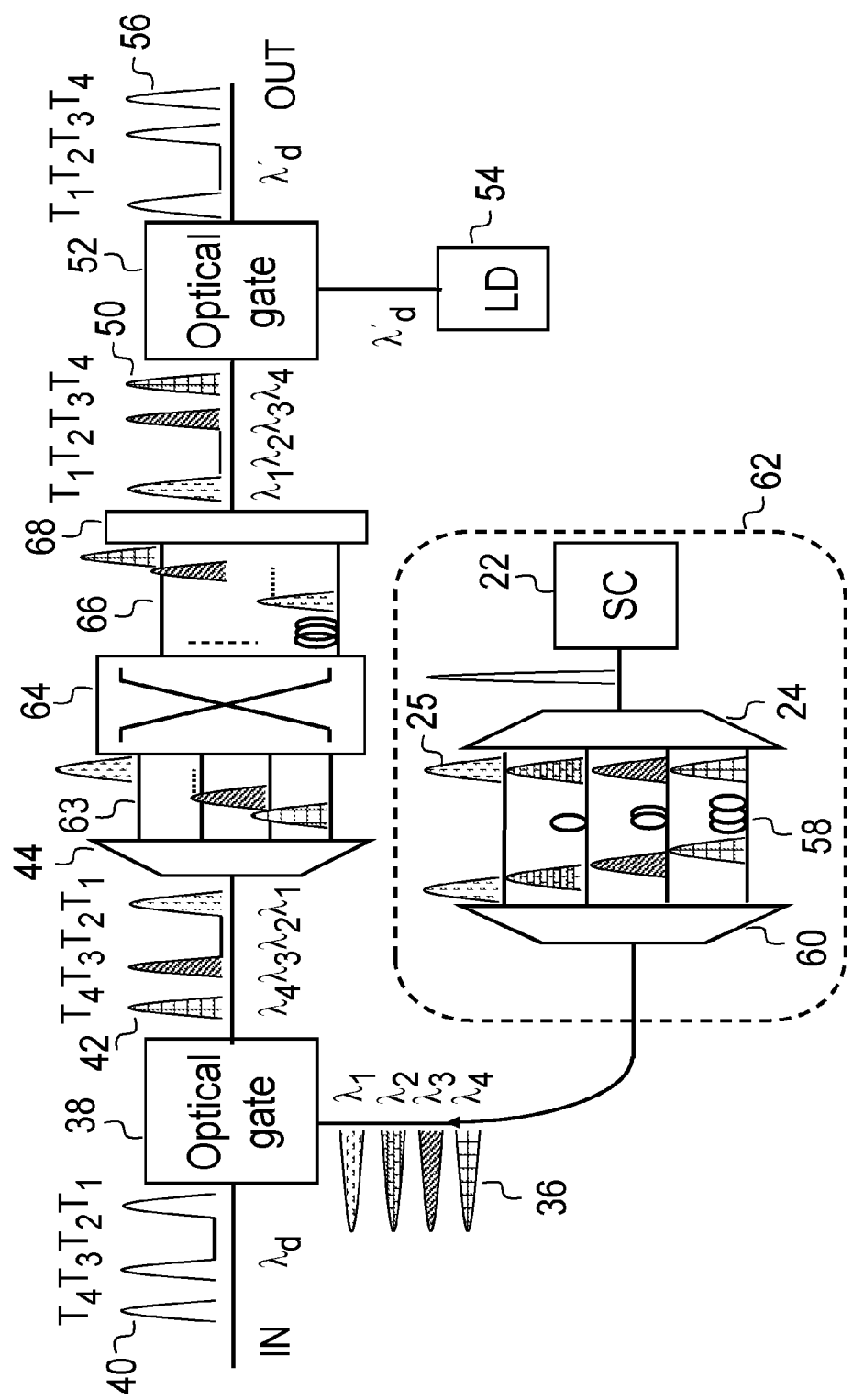
FIG. 3 is a schematic diagram of a second embodiment of a time-slot interchange according to the present invention.

In FIG. 3, subsequent to the spectral slicing using a de-multiplexer 24, as described in FIG. 2, the pulses 25 are individually delayed in a static structure of delays 58 and subsequently multiplexed, preferably by a wavelength multiplexer 60, to form a multi-wavelength pulse sequence 36. This sequence is non-permutable, and the multiwavelength pulsed laser source 62 is prior art. As in FIG. 2, the TDM data pulses 40 are translated into a multiwavelength pulse sequence 42. This data pulse sequence is subsequently wavelength de-multiplexed at 44 and each pulse is guided through one of the paths 63 according to its wavelength. A space switch 64 connects each such path to one of the output paths which provides the right delay 66. The delayed pulses are combined together by a power coupler 68 to form a permuted multi-wavelength pulse sequence 50. Therefore, by re-configuring the space switch 64 (which, in effect, re-configures the delay values of the delay lines) the sequence 50 may be further permuted. The sequence 50 may be subsequently wavelength converted as in FIG. 2.

Figure 4:
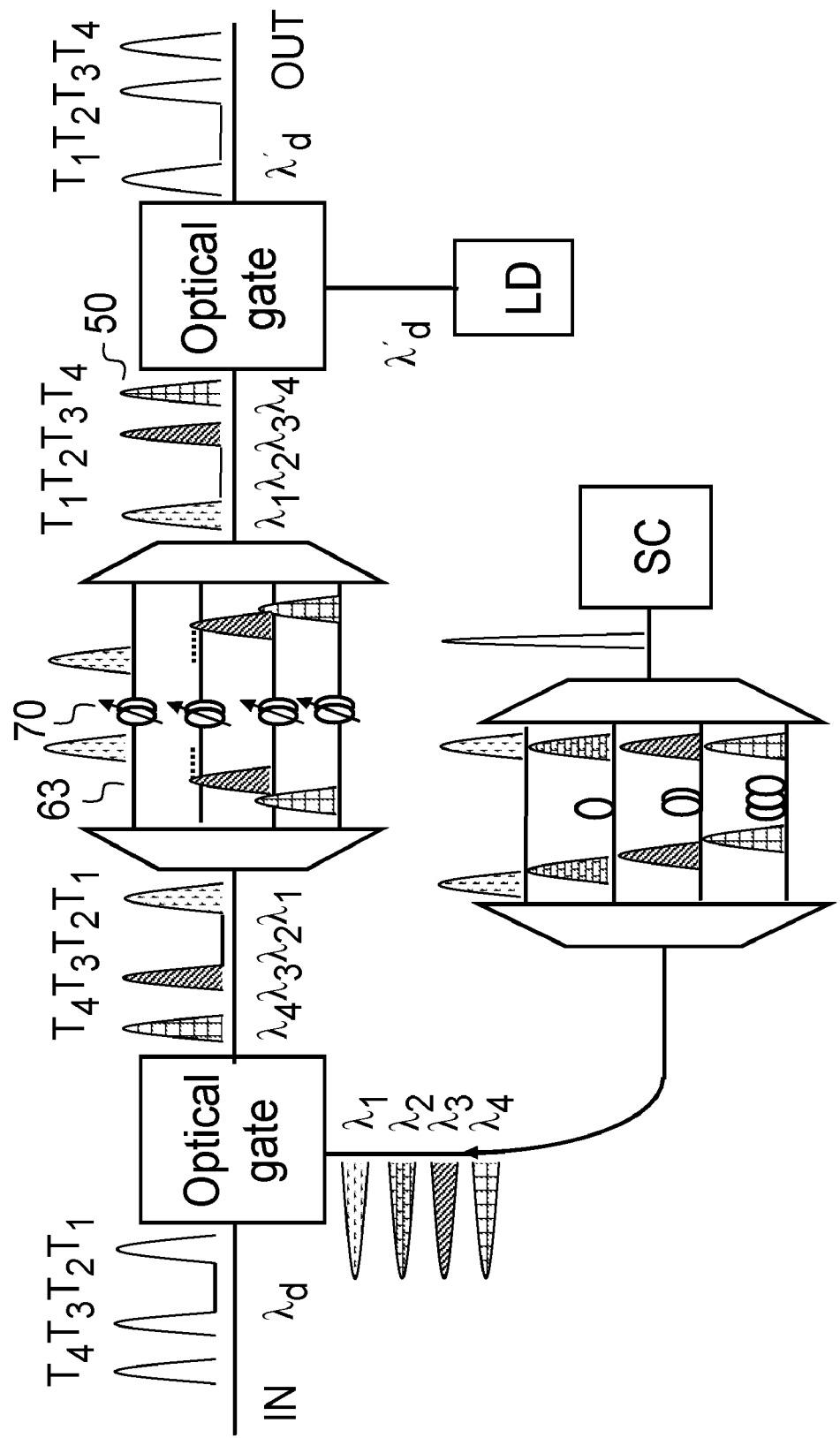
FIG. 4 is a schematic diagram of a third embodiment of a time-slot interchange according to the present invention.

FIG. 4, differs from FIG. 3 in that the space switch 64 and the delay lines 66 are replaced by variable (in other words, re-configurable) delay lines 70; each such variable delay being able to provide a plurality of delay values. Four paths 63 are sufficient for both frame integrity and non-frame integrity. The permuted sequence 50 may be further permuted by changing (or re-configuring) the value of the delay of some or of all of the delay lines 70.

Figure 5:
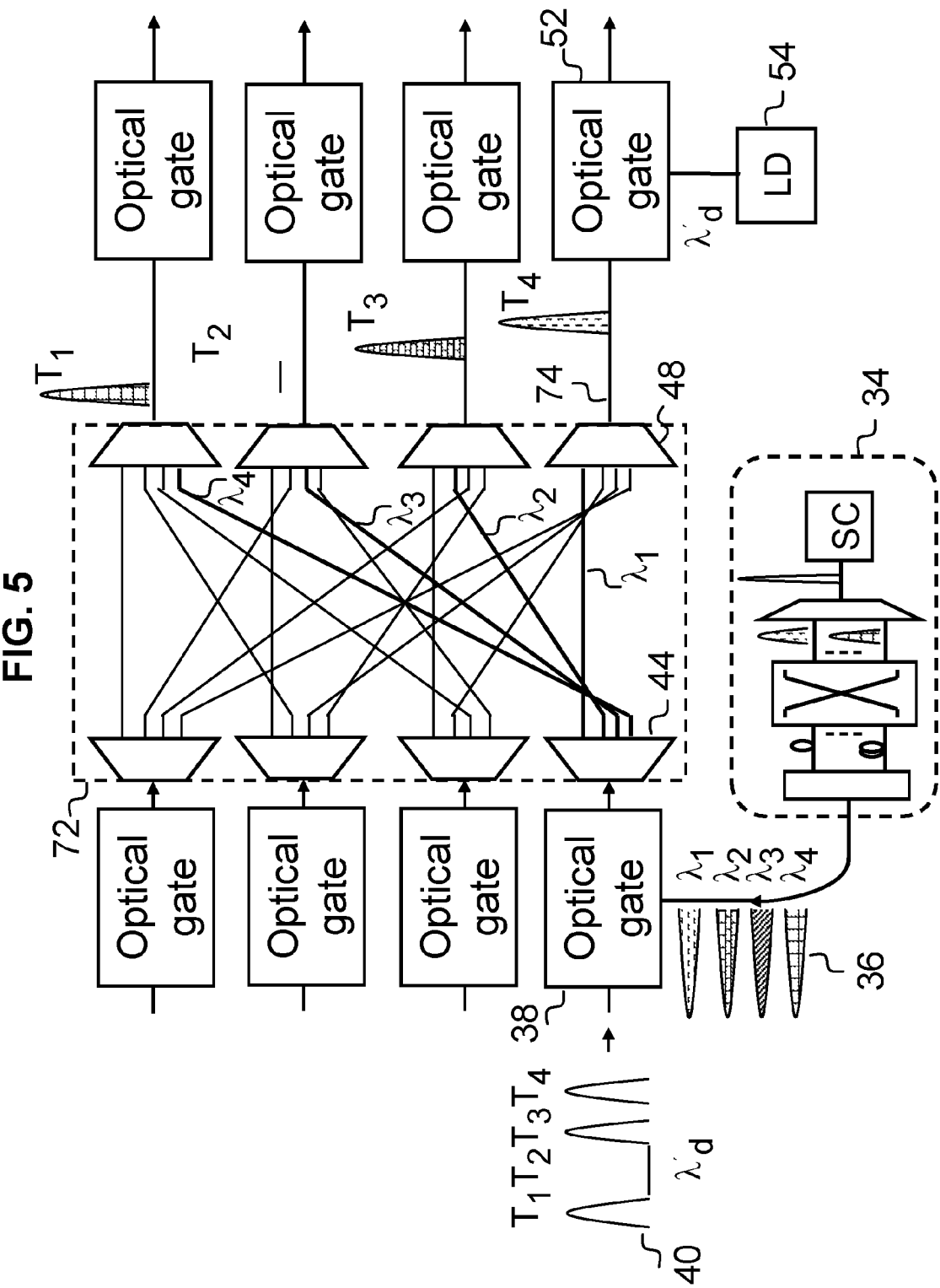
FIG. 5 is a schematic diagram of a first embodiment of a tributary space switch according to the present invention.

In FIG. 5, the permutable multi-wavelength pulse source 34 is used to provide a permutable multiwavelength pulse sequence 36 (including the cases where some or indeed all of the pulses 36 are of the same wavelength, as in FIG. 2). The pulses of an input higher data rate pulse sequence 40 are thus translated into a permutable multiwavelength data pulse sequence, as described in FIG. 2. This permutable data pulse sequence is subsequently wavelength de-multiplexed at 44 and each pulse (which belongs to a channel tributary) is guided, according to its wavelength, through a prior art static structure 72 which is also know as waveguide grating router and consists of a number of de-multiplexers 44 and multiplexers 48. By changing the permutation of the pulses 36 individual data pulses of frame 40 are translated to generally different wavelengths. Therefore, by selecting the right wavelength sequence 36, different pulses of frame 40, each belonging to a different channel tributary, will be guided individually through the waveguide grating router 72. For example, T4 is translated into $\lambda_1$ and exits 72 at output 74. The multiplexer 48 multiplexes tributaries which generally originate from different inputs to 72; thus space switching of tributaries is performed. The optional optical gate (or wavelength converter) 52 translates said tributaries to a common output wavelength of choice.

Figure 6:
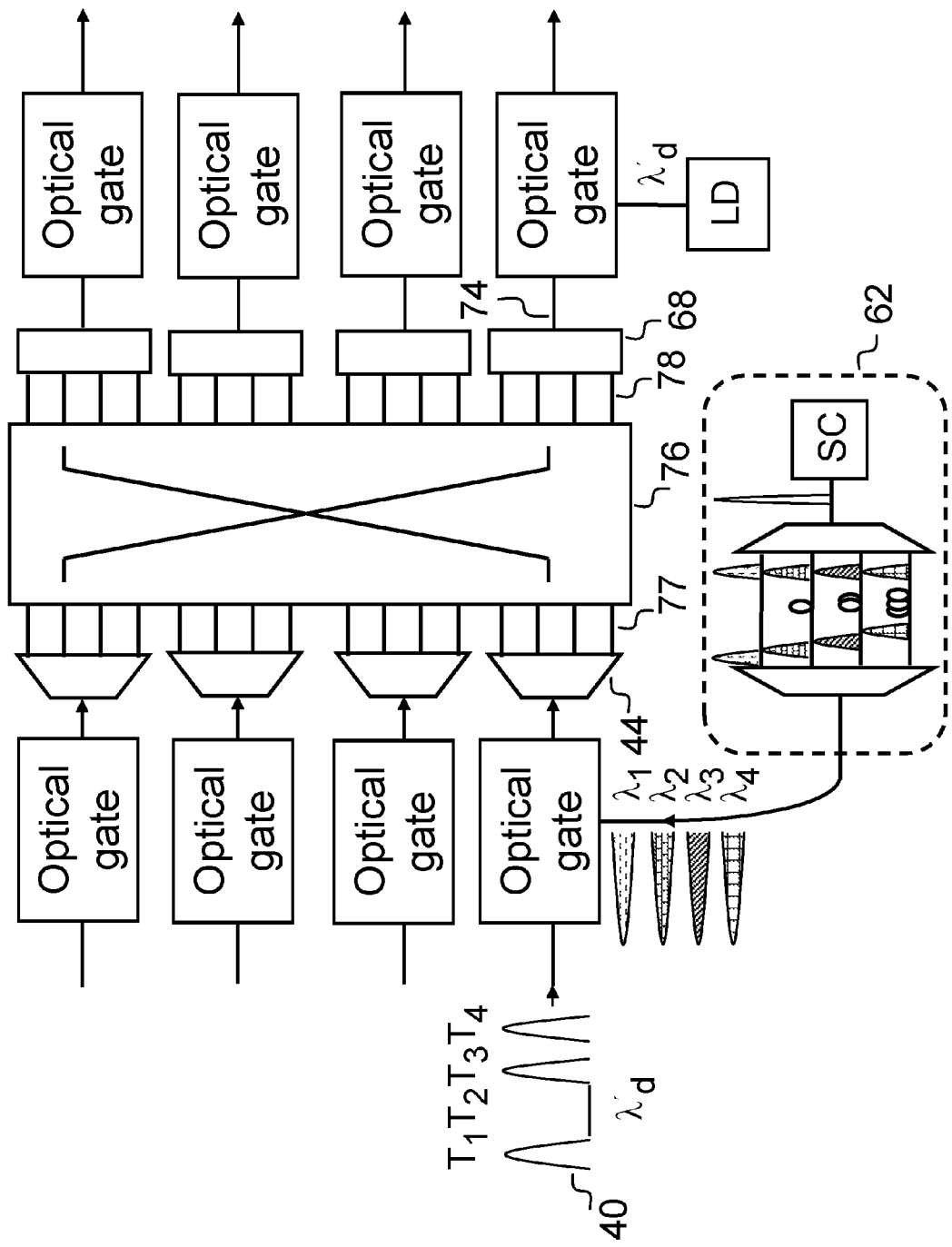
FIG. 6 is a schematic diagram of a second embodiment of a tributary space switch according to the present invention.

In FIG. 6, the non-permutable multiwavelength pulsed laser source 62 is used. The data pulses of frame 40 are thus translated into a non-permutable multiwavelength data pulse sequence. Each data pulse (and therefore, the associated channel tributary) after demultiplexing at 44 connects to a different input port, such as 77, of the space switch 76. The space switch connects input 77 to an available output port, such as 78, which belongs to the group of ports which are combined with coupler 68 into the desired output, such as 74. By combining channel tributaries which generally originate from different higher data rate inputs, space switching of tributaries can be performed. Re-configuration of the switch results in a new tributary space switching arrangement.

Figure 7:
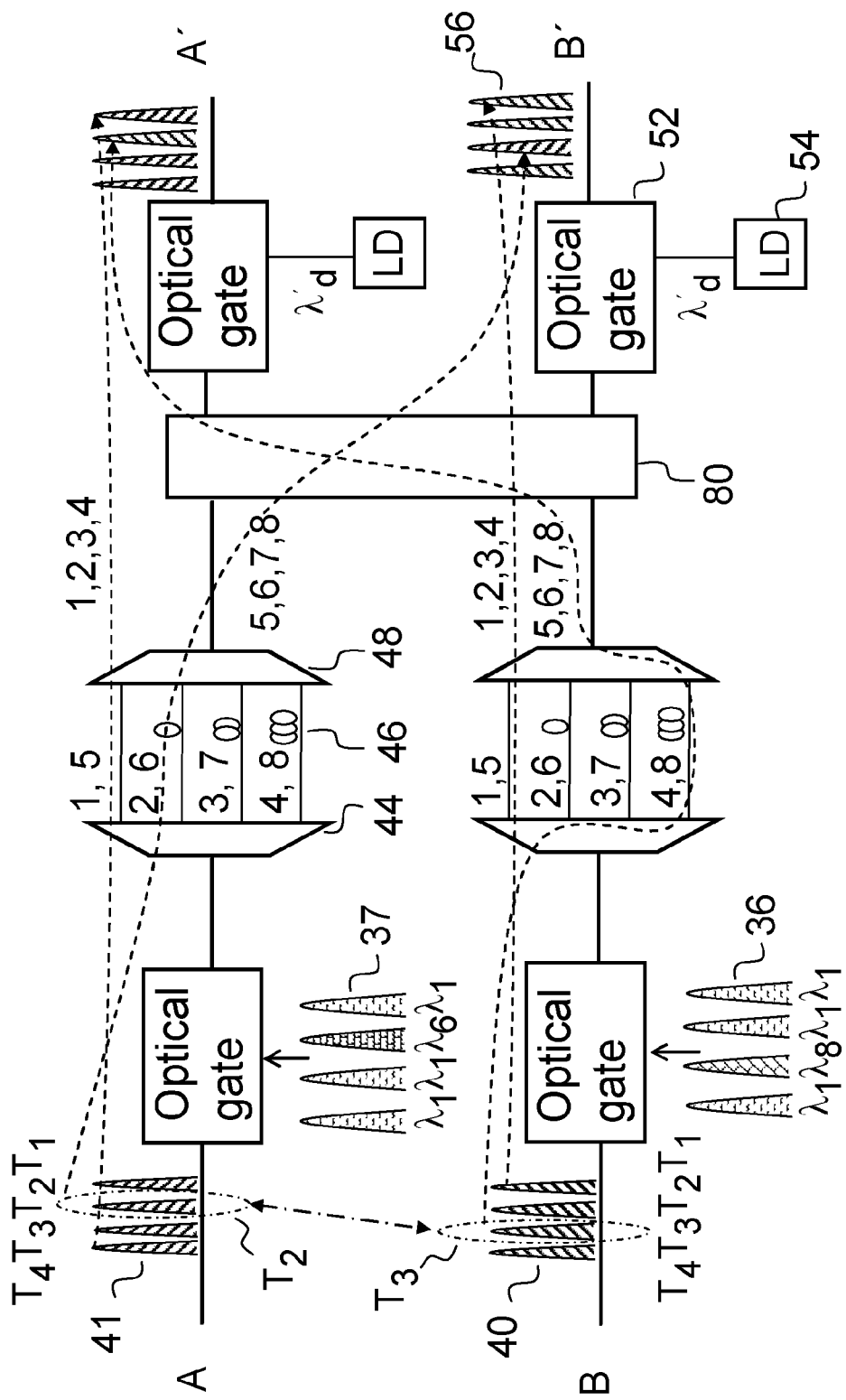
FIG. 7 is a schematic diagram of a first embodiment of a time multiplexed space switch according to the present invention.

FIG. 7, shows a T-S type of Time Multiplexed Space (TMS) switch, with functionality as in FIG. 1. In the depicted switching example, time-slot $T_2$ of input TDM data channel 41 is switched to slot $T_3$ of data 40, and vice versa, as follows: Data channel 41 is translated into a permutable multiwavelength (consisting in this case of up to eight different wavelengths) pulsed data sequence 37 which is subsequently de-multiplexed by 44 and guided through a structure of delays 46. The de-multiplexer may in this case be an arrayed waveguide grating type, with free spectral range (FSR) such that it guides, for example, both wavelengths 1 and 5, to the same path. Multiplexer 48 may be a similar arrayed waveguide grating and recombines the pulses which have travelled, in general, through different delays. Time-slot interchange, therefore, takes place as described in FIG. 2. The design of the waveguide grating router 80 which follows is such that it guides wavelengths 1, 2, 3, 4 straight through, towards output A', while it guides wavelengths 5, 6, 7, 8 cross, towards output B'. In this way time-slot $T_2$ of 41, which is translated into wavelength 6, after passing through a one bit delay in 46 it will reach output B' and form part of 56. In the same way, $T_3$ of 40 reaches output A', suitably delayed in order to take the place of $T_2$ of 41. Therefore, both time-slot interchange and space switching take place in this architecture, with only one wavelength translation taking place along the path. This T-S architecture has the full functionality of a T-S-T architecture and is benefited by the property of 'cyclic' wavelength routing of the arrayed waveguide gratings.

The invention claimed is:
1. A time multiplexed space switch comprising: at least one higher data rate input; at least one higher data rate output; at least one time-slot interchange; and at least one tributary space switch;
  wherein a higher data rate channel comprising a plurality of tributary data rate channels is incident at a higher data rate input;

wherein a higher data rate channel comprising a plurality of tributary data rate channels is output at a higher data rate output;

wherein each time-slot interchange comprises a multi-wavelength pulse laser source; a wavelength converter; a wavelength selective time-slot interchanger; one higher data rate input; and one higher data rate output; wherein the multi-wavelength pulse laser source includes at least one ultra-short pulse radiation laser source, a producer from said source of a plurality of different radiation wavelengths of synchronous pulsed radiation, a plurality of delay lines for delaying each different radiation wavelength of pulsed radiation by a certain delay value, and a combiner for merging the said plurality of delayed wavelength pulses into a sequence of multi-wavelength pulses in a single medium to form a multi-wavelength pulse sequence; wherein the wavelength converter translates the higher data rate channel at the higher data rate input of the time-slot interchange into a multi-wavelength data pulse sequence, according to the said multi-wavelength pulse sequence of the multi-wavelength pulse laser source which is also input to the wavelength converter; wherein the wavelength selective time-slot interchanger includes a wavelength de-multiplexer which de-multiplexes the said multi-wavelength data pulse sequence according to each data pulse wavelength, a plurality of channel tributary paths with each path connected to each output of the de-multiplexer, with some paths connected to delay lines of reconfigurable delay values, and a combiner for merging the said paths to form the output higher data rate channel of said time-slot interchange, wherein the output higher data rate channel of the time-slot interchange has the tributaries interchanged;

wherein each tributary space switch comprises at least one multi-wavelength pulse laser source; at least one wavelength converter; a wavelength selective space cross-connect; at least one higher data rate input; and at least one higher data rate output; wherein each multi-wavelength pulse laser source includes at least one ultra-short pulse radiation laser source, a producer from said source of a plurality of different radiation wavelengths of synchronous pulsed radiation, a plurality of delay lines for delaying each different radiation wavelength of pulsed radiation by a certain delay value, and a combiner for merging the said plurality of delayed wavelength pulses into a sequence of multi-wavelength pulses in a single medium to form a multi-wavelength pulse sequence; wherein each wavelength converter is subsequent to a higher data rate input of the tributary space switch and translates the higher data rate channel into a multi-wavelength data pulse sequence, according to the multi-wavelength pulse sequence of the said multi-wavelength pulse laser source which is also input to the wavelength converter; wherein the wavelength selective space cross-connect includes a wavelength de-multiplexer for each higher data rate input to the tributary space switch, said de-multiplexer is followed by a plurality of channel tributary paths with said path inputs connected to the outputs of the de-multiplexer, and with said channel tributary path outputs connected to a space switch, and with the space switch channel tributary outputs connected to a plurality of combiners, with each said combiner combining a plurality of channel tributary paths to form one higher data rate output of the tributary space switch; wherein the wavelength selective space cross-connect de-multiplexes into data channel tributaries each higher data rate multi-wavelength data pulse sequence from the output of a said wavelength converter, switches any said channel tributary to any channel tributary output of the said space switch, and combines said channel tributary outputs into higher data rate outputs of the tributary space switch.

2. A time multiplexed space switch according to claim 1, wherein the multi-wavelength pulse laser source of at least one time-slot interchange further comprises a switch, subsequent to the producer of a plurality of different radiation wavelengths of synchronous pulsed radiation, to form a permutable multi-wavelength pulse laser source; wherein the switch selects some of the different radiation wavelengths of synchronous pulsed radiation, and blocks and discards the unselected radiation wavelengths of synchronous pulsed radiation, and connects each thus selected radiation wavelength to a selected delay line of certain delay value.

3. A time multiplexed space switch according to claim 2, further comprising a wavelength converter in at least one of the higher data rate outputs of the time multiplexed space switch, to translate the said output multi-wavelength data pulse sequence into a single wavelength higher data rate pulse sequence.

4. A time multiplexed space switch according to claim 1, wherein the multi-wavelength pulse laser source of at least one tributary space switch further comprises a switch, subsequent to the producer of a plurality of different radiation wavelengths of synchronous pulsed radiation, to form a permutable multi-wavelength pulse laser source; wherein the switch selects some of the different radiation wavelengths of synchronous pulsed radiation, and blocks and discards the unselected radiation wavelengths of synchronous pulsed radiation, and connects each thus selected radiation wavelength to a selected delay line of certain delay value.

5. A time multiplexed space switch according to claim 4, wherein the multi-wavelength pulse laser source of at least one time-slot interchange further comprises a switch, subsequent to the producer of a plurality of different radiation wavelengths of synchronous pulsed radiation, to form a permutable multi-wavelength pulse laser source; wherein the switch selects some of the different radiation wavelengths of synchronous pulsed radiation, and blocks and discards the unselected radiation wavelengths of synchronous pulsed radiation, and connects each thus selected radiation wavelength to a selected delay line of certain delay value.

6. A time multiplexed space switch according to claim 5, wherein the delay values, of the delay lines in the channel tributary paths of at least one time-slot interchange, are fixed.

7. A time multiplexed space switch according to claim 6, wherein the multi-wavelength pulse laser source of at least one tributary space switch is non-permutable.

8. A time multiplexed space switch according to claim 7, further comprising a wavelength converter in at least one of the higher data rate outputs of the time multiplexed space switch, to translate the said output multi-wavelength data pulse sequence into a single wavelength higher data rate pulse sequence.

9. A time multiplexed space switch according to claim 6, wherein the wavelength selective space cross-connect of at least one tributary space switch does not contain a space switch for interconnecting input channel tributaries with output channel tributaries; instead the said wavelength selective space cross-connect contains permanent connections between pairs of input channel tributaries and output channel tributaries.

10. A time multiplexed space switch according to claim 9, wherein tandem arrangements of a wavelength selective time-slot interchanger and a wavelength selective space cross-connect require a single wavelength translation stage of an input higher data rate channel into a multi-wavelength data pulse sequence, by the use of the cyclic wavelength routing of arrayed waveguide gratings.

11. A time multiplexed space switch according to claim 10, further comprising a wavelength converter in at least one of the higher data rate outputs of the time multiplexed space switch, to translate the said output multi-wavelength data pulse sequence into a single wavelength higher data rate pulse sequence.

12. A time multiplexed space switch according to claim 6, further comprising a wavelength converter in at least one of the higher data rate outputs of the time multiplexed space switch, to translate the said output multi-wavelength data pulse sequence into a single wavelength higher data rate pulse sequence.

13. A time multiplexed space switch according to claim 9, further comprising a wavelength converter in at least one of the higher data rate outputs of the time multiplexed space switch, to translate the said output multi-wavelength data pulse sequence into a single wavelength higher data rate pulse sequence.

14. A time multiplexed space switch according to claim 5, wherein the wavelength selective space cross-connect of at least one tributary space switch does not contain a space switch for interconnecting input channel tributaries with output channel tributaries; instead the said wavelength selective space cross-connect contains permanent connections between pairs of input channel tributaries and output channel tributaries.

15. A time multiplexed space switch according to claim 14, wherein the multi-wavelength pulse laser source of at least one time-slot interchange is non-permutable.

16. A time multiplexed space switch according to claim 15, further comprising a wavelength converter in at least one of the higher data rate outputs of the time multiplexed space switch, to translate the said output multi-wavelength data pulse sequence into a single wavelength higher data rate pulse sequence.

17. A time multiplexed space switch according to claim 14, further comprising a wavelength converter in at least one of the higher data rate outputs of the time multiplexed space switch, to translate the said output multi-wavelength data pulse sequence into a single wavelength higher data rate pulse sequence.

18. A time multiplexed space switch according to claim 5, further comprising a wavelength converter in at least one of the higher data rate outputs of the time multiplexed space switch, to translate the said output multi-wavelength data pulse sequence into a single wavelength higher data rate pulse sequence.

19. A time multiplexed space switch according to claim 4, further comprising a wavelength converter in at least one of the higher data rate outputs of the time multiplexed space switch, to translate the said output multi-wavelength data pulse sequence into a single wavelength higher data rate pulse sequence.

20. A time multiplexed space switch according to claim 1, further comprising a wavelength converter in at least one of the higher data rate outputs of the time multiplexed space switch, to translate the said output multi-wavelength data pulse sequence into a single wavelength higher data rate pulse sequence.

* * * * *